Figure 1:
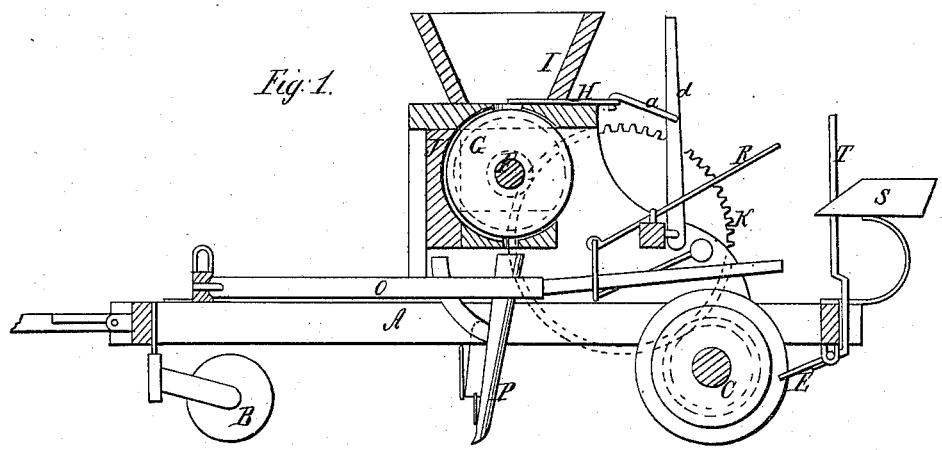
Figure 2:
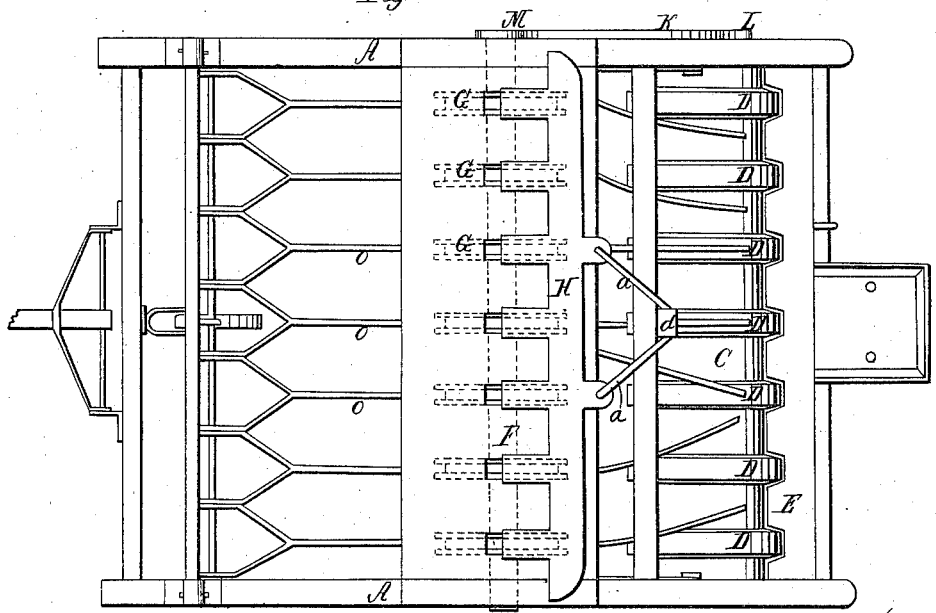

D. L. Dickson,
Grain Drill.
No. 78,792. Patented Jan. 9, 1868.

Witnesses:
V. D. Stockbridge
A. R. Mann

Inventor:
Dan'l L. Dickson
per Alexander Mason
Att'ys

United States Patent Office.

DANIEL L. DICKSON, OF DURHAM, ILLINOIS.

Letters Patent No. 78,792, dated June 9, 1868.

---

IMPROVEMENT IN GRAIN-DRILL.

---

The Schedule referred to in these Letters Patent and making part of the same.

---

TO ALL WHOM IT MAY CONCERN:

Be it known that I, DANIEL L. DICKSON, of Durham, in the county of Hancock, and in the State of Illinois, have invented certain new and useful Improvements in Grain-Drills; and do hereby declare that the following is a full, clear, and exact description thereof, reference being had to the accompanying drawings, and to the letters of reference marked thereon.

In the annexed drawings, making part of this specification, A represents a frame, made of suitable size for a seeding-machine, and supported at its forward end by means of a caster-wheel, B, and at its rear end by means of a cast-iron roller, C. This roller is provided with journals upon its ends, which have their bearings in the frame A, and also has cast upon its periphery a series of flanges, D D, which are made broad enough to run in the furrows in which the grain is deposited, to compact the earth immediately over and just about the grain, for the purpose hereinafter stated. A box, J, is erected upon the centre of the frame, and is secured crosswise upon it. Running from one end of this box to the other is a shaft, F, which has its bearings in the ends of the box, and upon this box a series of wheels, G G, with grooved peripheries, is secured at proper intervals. Upon top of the box J is secured a seed-hopper, I. This hopper has openings cut in its bottom to correspond with openings cut in the top of the box J. These openings are immediately over the grooves in the wheels G G, and admit grain to them. H represents a slide in the bottom of the hopper, which is intended to open or close the seed-openings, or to regulate the amount of seed which passes to the grooved wheels. This slide is regulated by a rod, a, and lever-handle, d. O O represent a series of fluke or draw-bars, which are hinged to the forward part of the frame, and whose rear ends pass back under box J, and rest over the roller C. To these bars are secured the seed-discharge spouts, which perform the usual functions of opening the furrow for and depositing the grain. A rod passes under the rear ends of these bars, and is regulated by means of a lever, R. This lever serves to raise the rear ends of said bars for the purpose of raising the seed-spouts out of the ground when necessary. E represents a scraper, which has teeth, which project in between the flanges D D of the roller C, for the purpose of keeping it free from dirt, &c. This scraper is governed by a lever, T. The levers d, R, and T are all within reaching distance of the operator, who sits in the seat at S.

In using this machine, the grain is placed in the hopper I, and the machine is drawn forward by a suitable team. The roller C, revolving, drives the shaft F by means of L, K, and M. The wheel L is secured upon the shaft of roller C, and gears into an idle-wheel, K, and this idle-wheel gears into the wheel M, which is secured to the shaft F. The grain passes through from the hopper to the grooved wheels G, and is carried by them into the discharge-spouts, and through them it passes to the earth. The flanges of the roller C follow in the furrows, in which the grain has been deposited, and packs the earth over and around the seed. The object of this flanged roller is to pack the earth over the seed and in the bottom of the furrow, so that the grain will be protected from cold during the winter, and will not be so liable to winter-kill.

The ridges between the drills of grain serve to break the wind, and at the same time cause the snow to drift into and over the furrows containing the grain, and thus protect it from freezing.

When the frost comes out of the ground in the spring, the bottoms of the furrows do not upheave, while, on the other hand, the earth from the ridges falls in around the grain, and the moisture and rains pack it, which protects its roots.

The great object of this machine is, as before stated, to prevent the winter-killing of wheat, or other small grain.

Having thus fully described my invention, what I claim as new, and desire to secure by Letters Patent, is—

The arrangement of the shaft F in the box J, and provided with a series of wheels with circumferential grooves, in combination with the hinged fluke-bars O O, that extend under the hopper to the flanged roller C, the various parts being constructed and operating substantially as specified.

In testimony that I claim the foregoing, I have hereunto set my hand, this 14th day of March, 1868.

DANIEL L. DICKSON.

Witnesses:
J. H. RAWSON,
EVERETT MUNSON.